UNITED STATES PATENT OFFICE 2,338,178

CONDENSATION PRODUCT

Charles Graenacher, Riehen, and Richard Sallmann, Bottmingen, Switzerland, assignors to Society of Chemical Industry in Basle, Basel, Switzerland, a firm No Drawing. Application March 1, 1940, Serial No. 321,806. In Switzerland March 15, 1939

9 Claims. (Cl. 260—402.5)

It has been found that new condensation products are obtained when an amide, in which at least one nitrogen atom, united to a carbonyl group, is combined with a least one hydrogen atom, is caused to react with an α-halogenmethyl-ether of an alcohol being free from reactive substituents, and at least one water-solubilizing group is introduced into the condensation product advantageously by treatment of the condensation product with a member of the group consisting of thio-ureas capable of reacting in the iso form, secondary and tertiary amines, cyanamide, dicyandiamide and dicyandiamidine. The expression thio-ureas capable of reacting in the iso form is to be understood to comprise those which can react in the form of the atomic grouping

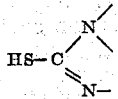

The express emphasis laid in the above first sentence on one particular group is justified for the reason that just the products obtained with the members of this group are characterized by especially valuable properties, that is, with all members of this group cation-active products may be obtained which possess the particularly valued property of being absorbed by the cellulose fiber. In particular, the products of higher molecular weight of the present invention, which have been made water-soluble by means of a member of the said group, possess a pronounced affinity for the cellulose fiber.

Among the amines, in which at least one nitrogen atom, united to a carbonyl group, is combined with at least one hydrogen atom, the following, for example, come into consideration: carboxylic acid amides derived from ammonia or from primary amines, also ureas or urethanes which contain free hydrogen atoms united to the amide nitrogen atom, and, furthermore, secondary carboxylic acid amides.

The carboxylic acid amides which may be used as parent materials may be derived from ammonia or from primary amines and from mono- or poly-basic, saturated or unsaturated carboxylic acids of the aliphatic, mixed aliphatic-aromatic, cyclo-aliphatic or heterocyclic series; if desired, they can contain a higher molecular aliphatic or cyclo-aliphatic radical. Such amides, for example, are those derived from ammonia or primary amines and from carboxylic acids, such as formic, acetic, propionic, butyric, valeric, caproic, capric, lauric, myristic, palmitic, stearic, behenic, undecylenic, oleic, linoleic, linolenic, chloracetic, bromacetic, α-bromolauric, succinic, adipic, maleic, benzoic, salicylic, hydroxynaphthoic, phenylacetic, phthalic, hexahydrobenzoic acids, as well as naphthenic acids and resin acids. Among the primary amines, from which are derived the mono-substituted carboxylic acid amides to be used according to the present process, may be named: aliphatic amines, such as methyl, ethyl, propyl, isopropyl, butyl, amyl, hexyl, dodecyl amines, diethylaminoethylamine, ethanolamine, polyalkylene-polyamines, such as triethylenetetramine, cycloaliphatic amines, such as cyclohexyl, methylcyclohexyl amines, aromatic amines, such as aniline, chloraniline, para-dimethylaminoaniline, toluidines, naphthylamines, for example, β-naphthylamine, aliphatic-aromatic amines, such as benzylamine, and the like.

The primary and N-monosubstituted carboxylic acid amides, of which use is to be made in the present case, are either known or may be prepared according to analogous processes, for example, from the corresponding carboxylic acid halides or esters by means of primary amines.

As ureas, such ureas are applicable in the present process as contain at least one substituent at at least one nitrogen atom and, in addition, at least one free H-atom united to a N-atom. Into consideration come, for example, monomethyl-, monoethyl-, monophenyl-, monododecyl-, N:N'-dimethyl-, N:N'-diethyl-, N:N'-diphenyl-, N:N'-didodecylurea.

As urethanes, such urethanes are applicable in the present instance as contain at the most one substituent at the nitrogen atom. For example, use may be made of the urethanes obtained from chloroformic acid esters with ammonia or primary amines.

The secondary carboxylic acid amides coming equally into consideration as starting materials for the present process may be derived from the carboxylic acids already mentioned. Diacetamide, dibenzamide, dilauric-amide and distearic-amide may be named.

As α-halogen methyl ethers, derived from alcohols free from reactive substituents, use may be made, for example, of the α-bromomethyl ethers and the α-chloromethyl ethers of unsubstituted alcohols. Among these alcohols may be named:—methyl, ethyl, propyl, isopropyl, butyl, isobutyl, amyl, hexl, dodecyl alcohols, also cyclo-aliphatic alcohols, such as cyclohexanol and methylcyclohexanol.

The reaction between the amides mentioned and the α-halogen methyl ethers may take place by mixing at ordinary temperature. The speed of reaction may be accelerated by the use of raised temperatures, working, for example, at 50-100° C. If desired, use may also be made of solvents, such as chloroform, trichlorethylene, carbon tetrachloride, benzene or chlorobenzene. For every amino group, at least 1 mol of α-halogen methyl ether should be employed, but it is advantageous to use an excess, and treatment, or heating, is carried out until the reaction is concluded. At the end of the reaction, any excess of α-halogen alkyl ether may be easily removed by distillation, preferably under diminished pressure.

The new condensation products obtainable by the present process are either solid or liquid substances, which contain very reactive halogen atoms. By known methods, these reactive halogen atoms may be very easily converted into water-solubilizing groups, for example into thiosulphuric acid groups, also into onium groups, such as quaternary ammonium groups or ternary sulphonium groups. The reactive halogen atoms may also be replaced by amino or imino groups, or by radicals containing such groups, for example, by cyanamide, dicyandiamide or dicyandiamidine radicals, or by thio-urea radicals, which radicals, when converted into the salt form, equally bestow water-soluble properties on the condensation products.

The conversion of a reactive halogen atom into a quaternary ammonium group may take place, for example, by addition of tertiary amines, such as trimethylamine, triethylamine, triethanolamine, pyridine, N-methylpiperidine. Such an addition may be carried out, for example, at ordinary or at a raised temperature, if desired, in the presence of solvents. Amino groups or thiourea radicals may be introduced by heating the condensation products with amines, such as diethylamine, piperidine, or with thio-urea compounds, which contain or are able to form a

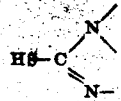

group, such as thio-urea, N-methyl-, N:N'-dimethyl- or N-phenyl-ureau. The presence of a solvent or diluent is often advantageous in the last named reaction. Thiosulphuric acid groups may be introduced by treatment of the condensation products mentioned with sodium thiosulphate or with other thiosulphates, at ordinary or at a raised temperature, if desired in the presence of solvents, such as acetone, alcohol, etc.

By suitable choice of the parent materials, the products obtainable by the present process may find application as auxiliary products, among other things, for example, in the textile, leather and paper industries. On account of their capillary active properties, those water-soluble products which contain a higher molecular aliphatic or cyclo-aliphatic radical form wetting, softening, foaming and water repelling agents; they may also find application as disinfectants and preservatives.

The constitution of the products obtained according to the present invention could not be determined with certainty owing to the ease of decomposition of the intermediate and end products. It is certainly to be assumed that the group conferring water-soluble properties is united to a nitrogen atom combined with a carbonyl group by means of a bridge, of a type not yet determined, which is derived from the α-halogen methyl ether used. During the reaction of the α-halogen methyl ether with the amide, the residue of the unsubstituted alcohol contained in the α-halogen methyl ether used is probably split off and N-chloro-methyl derivatives of the amide which has been used as starting materials are formed. However, the products of the present invention can only be distinguished with certainty by their methods of preparation.

The particular interest of the products of the present process lies in their property of decomposing when heated or treated with saponifying agents, when insoluble substances may be deposited. If this decomposition takes place on a substrate, for instance, on textiles, this insoluble substance is deposited in a strongly adherent form. According to its nature, it can bestow upon the fiber certain valuable properties. Among these properties may be emphasised that of being waterproof or water repellent in a form which is fast to washing, and which, if desired, may be combined with particular softness and fullness of handle, this latter property being capable of being increased by the addition of certain filling agents. Also, a pronounced lowering of the hygroscopic properties and increased isolating activity against heat and electricity may be attained. Further properties which may be bestowed upon the fiber are, for example, crease resistance, resistance to displacement of the threads, reduction of the lustre, increase of the resistance towards water, resistance to shrinking of woven materials, and in the case of wool, resistance to felting. By local application of the process, calender, matt and damask effects may be obtained, as well as colored effects caused by the altered affinity of the fibers for dyestuffs. If the process is applied to dyed textiles, the properties of the dyeing, such as its fastness to rubbing, washing and water, are appreciably improved. These differing effects may be combined together. Water repellency fast to washing is particularly to be obtained when textiles, such as cotton, are treated with condensation products which contain a higher molecular radical, for example, a radical with 16-18 carbon atoms. Condensation products of this nature are derived, for example, from thio-ureas.

The products of the present invention may be applied either alone or in combination with other substances, such as salts—particularly with salts of weak acids, for example, sodium acetate, ammonium acetate, or aluminium formate—also together with solvents or substances which increase the solubility of the compound, such as ureas, thio-ureas, or ammonium thiocyanate. They may also be used with soaps, soap-like substances, protective colloids, finishing agents, such as methylol ureas, weighting, softening or matting agents and the like.

*Example 1*

14 parts by weight of the amide of the hardened fatty acids from whale oil are heated with 30 parts by weight of chloromethyl-ethyl ether for three hours in a bath at 90° C. with stirring. The excess of chloromethyl-ethyl ether is hereupon distilled under reduced pressure. The residue is dissolved in 40 parts by volume of acetone and is allowed to drop into a suspension of 6 parts of finely powdered thio-urea in 80 parts by volume of acetone at 10-15° C. When all has been introduced, the mixture is warmed for ½ hour at 40° C., then cooled to 10-15° C. and filtered.

The condensation product, a white powder, when dissolved in a little alcohol and diluted with water, gives a clear, foaming solution, which decomposes on heating. The course of the reaction may probably be represented by the following equations:

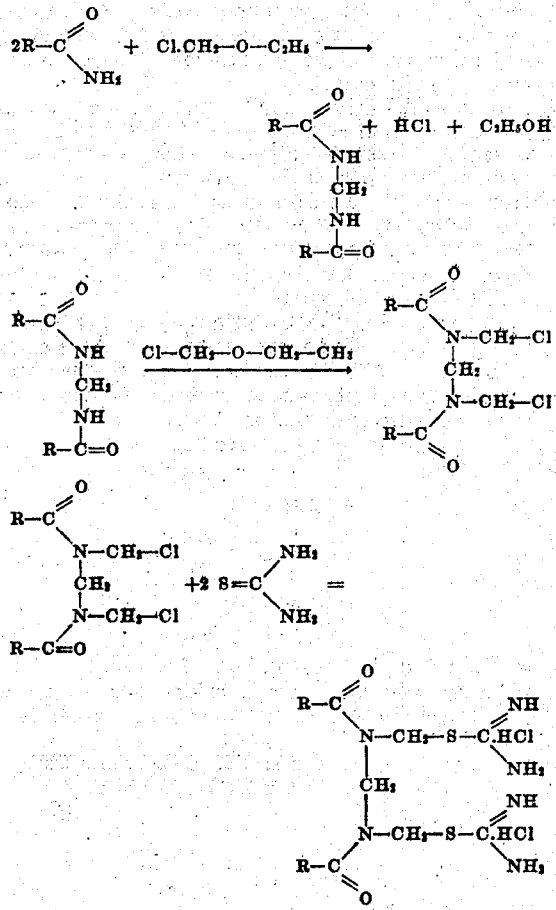

(R being the alkyl radical of the hardened fatty acids from whale oil which is united with the carboxylic group.)

The condensation product described above may be used in the following manner to obtain softening and water repellent effects on textiles which are fast to washing.

10 parts by weight of the product described above are pasted with 10 parts by volume of alcohol and 100 parts by volume of water at 70 C. are added to the moistened product. A clear solution is formed at once, which is then made up to 1000 parts by volume with cold water. 3 parts by weight of sodium acetate are then added to the solution thus obtained, and a piece of cotton poplin, previously dyed with 3% Direct Sky Blue green shade, is padded twice through this treating bath. The material, which has been squeezed so that it retains its own weight of the treating liquor, is dried at 75° C., and it is then subjected to a heating treatment for 4 minutes at 100–140° C. The material thus obtained is outstandingly soft and water repellent, these properties being resistant both to washing with soap solutions and washing with carbon tetrachloride.

In the reaction mentioned above, in place of the amide of the hardened fatty acids from whale oil, caproic acid amide or lauric acid amide may be used in a similar manner. The thio-urea may be similarly replaced by pyridine, piperdine, cyanamide, dicyandiamide or dicyandiamidine.

*Example 2*

14 parts by weight of stearic acid anilide are heated with 30 parts by volume of chloromethyl-ethyl ether for 3½ hours in a bath at 90° C. with stirring, by which time the evolution of hydrochloric acid gas is complete. After removal of the excess of chloromethyl-ethyl ether by distillation, the residue is dissolved in 35 parts by volume of acetone and is allowed to drop into a suspension of 7 parts of finely powdered thiourea in 70 parts by volume of acetone at 10–15° C. with good stirring. When all has been introduced, the mixture is heated for 30 minutes to 35–40° C. and is then again cooled to 10° C. and filtered. The new product, an almost colorless powder, when dissolved in a small quantity of alcohol and diluted with water, gives clear a solution which foams strongly. When the solution is heated for a short time, the foaming properties disappear, and the originally clear solution becomes very turbid. The course of the reaction may probably be represented by the following equations:

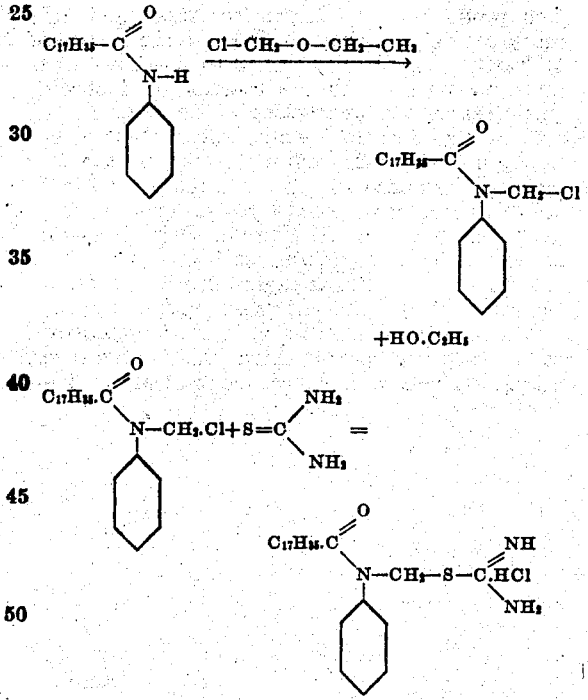

In the reaction described above, lauric acid anilide or stearic acid methyl amide may be used in exactly the same manner in place of the stearic acid anilide. The thio-urea may here, also, be replaced by pyridine, cyanamide or dicyandiamide.

What we claim is:

1. Process for the manufacture of condensation products, which comprises reacting an amide, in which at least one nitrogen atom bound to a carbonyl group is connected with at least one hydrogen atom, with an α-halogen-methyl ether of an alcohol which is free from reactive substituents, and reacting the resultant reaction product with a solubilizing agent containing at least one nitrogen atom directly linked to at least one carbon atom and selected from the group consisting of thio-ureas capable of reacting in the iso form, secondary and teritiary amines, cyanamide, dicyandiamide and dicyandiamidine.

2. Process for the manufacture of condensation products, which comprises reacting a primary amide of a carboxylic acid, with an α-halogen-methyl ether of an alcohol which is free from reactive substituents, and reacting the resultant reaction product with a solubilizing agent containing at least one nitrogen atom directly linked to at least one carbon atom and selected from the group consisting of thio-ureas capable of reacting in the iso form, secondary and tertiary amines, cyanamide, dicyandiamide and dicyandiamidine.

3. Process for the manufacture of condensation products, which comprises reacting a primary amide of a fatty acid containing at least 12 carbon atoms, with an α-halogen-methyl ether of an alcohol which is free from reactive substituents, and reacting the resultant reaction product with a solubilizing agent containing at least one nitrogen atom directly linked to at least one carbon atom and selected from the group consisting of thio-ureas capable of reacting in the iso form, secondary and tertiary amines, cyanamide, dicyandiamide and dicyandiamidine.

4. Process for the manufacture of condensation products, which comprises reacting a primary amide of a fatty acid containing at least 12 carbon atoms, with chlormethyl-ethyl ether and reacting the resultant reaction product with thio-urea capable of reacting in the iso form.

5. Process for the manufacture of condensation products, which comprises reacting the primary amide derived from hardened fish oil fatty acids with chloro-methyl-ethyl ether and reacting the resultant reaction product with thio-urea capable of reacting in the iso form.

6. Process for the manufacture of condensation products, which comprises reacting an amide, in which at least one nitrogen atom bound to a carbonyl group is connected with a hydrogen atom and with a hydrocarbon radical, with an α-halogen-methyl ether of an alcohol which is free from reactive substituents, and reacting the resultant reaction product with a solubilizing agent containing at least one nitrogen atom directly linked to at least one carbon atom and selected from the group consisting of thio-ureas capable of reacting in the iso form, secondary and teritiary amines, cyanamide, dicyandiamide and dicyandiamidine.

7. Process for the manufacture of condensation products, which comprises reacting an amide, in which at least one nitrogen atom bound to a carbonyl group is connected with a hydrogen atom and with an aryl radical, with an α-halogen-methyl ether of an alcohol which is free from reactive substituents, and reacting the resultant reaction product with thio-urea capable of reacting in the iso form.

8. Process for the manufacture of condensation products, which comprises reacting stearic acid anilide with chloromethyl-ethyl ether and reacting the resultant reaction product with thio-urea capable of reacting in the iso form.

9. The product of the formula

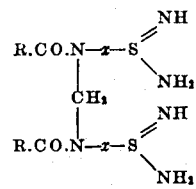

wherein R is the alkyl radical of a hardened fish oil fatty acid and $x$ is a bridge derived from chloromethyl-ethyl ether and contains a —$CH_2$— group.

CHARLES GRAENACHER.
RICHARD SALLMANN.